Sept. 18, 1956 W. SHOCKLEY 2,763,832
SEMICONDUCTOR CIRCUIT CONTROLLING DEVICE
Filed July 28, 1951
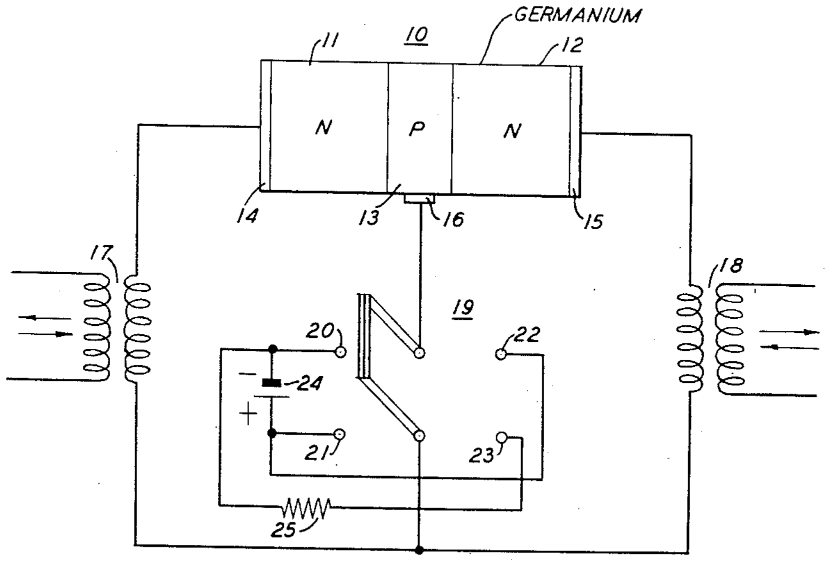
INVENTOR
W. SHOCKLEY
BY
ATTORNEY

United States Patent Office 2,763,832

Patented Sept. 18, 1956

2,763,832

SEMICONDUCTOR CIRCUIT CONTROLLING DEVICE

William Shockley, Madison, N. J., assignor to Bell Telephone Laboratories, Incorporated, New York, N. Y., a corporation of New York Application July 28, 1951, Serial No. 239,166

6 Claims. (Cl. 323—94)

This invention relates to circuit controlling devices and more particularly to such devices utilizing semiconductive materials, such as germanium.

One general object of this invention is to facilitate and control the current flowing in a path or circuit. More specifically, one object of this invention is to effect ready and marked alteration in the impedance presented by a semiconductor element in an electrical system.

A feature of this invention pertains to the control of signal current flowing through a semiconductive body by marked variation of the conductance of the body in accordance with a control current of magnitude small in comparison to that of the signal current.

As an aid to understanding the performance of devices constructed in accordance with this invention, it may be remarked that, as is now known, current flow in semiconductors such as germanium may be by way of either electrons or holes, or both. Normally, electrons are the majority carriers in N-type material and holes are the majority carriers in P-type material. Both types of carriers, holes and electrons, can flow across a PN junction under proper bias conditions. Also, as is developed in detail in the article "The theory of p-n junctions in semiconductors and p-n junction transistors" in the Bell System Technical Journal, volume 28, No. 3, July 1949, by W. Shockley, and as is now known, semiconductive bodies of NPN or PNP configuration exhibit a current multiplication characteristic commonly evaluated by the current multiplication factor alpha. This factor, in well constructed bodies approaches a value of unity, and values in excess of 0.99 are readily obtainable.

A circuit controlling device in accordance with this invention comprises a semiconductive body, for example of germanium, having therein a thin zone of one conductivity type, i. e. N- or P-type, between and contiguous with two zones of the opposite conductivity type, i. e. P- or N-type respectively. Bodies of such configuration, namely NPN or PNP, may be produced, for example, in the manner described in the application Serial 168,184, filed June 15, 1950, of G. K. Teal, now Patent 2,727,840, issued December 20, 1955. Briefly, in the method therein disclosed, a single crystal body is drawn from a melt of semiconductive material and inversions in conductivity type of successively drawn portions of the crystal are effected by control of the impurity content and character of the melt. For example, a single crystal NPN body of germanium may be produced by using a melt of germanium wherein initially a donor impurity, for example antimony, is in excess whereby the first drawn portion of the crystal is of N-type. By addition of a suitable acceptor impurity, for example gallium, to the melt, a subsequently drawn portion of the crystal is of P-type. Then, by addition of a donor impurity, such as antimony, to the melt, N-type conductivity is obtained for subsequently drawn parts of the crystal. The adjacent parts or zones form PN junctions and the final product exhibits uniformity of crystalline structure and axis orientation.

Substantially ohmic connections are made to the outer zones of the body, these serving as terminals whereby the device may be associated in a desired circuit. The impedance between these terminals is dependent upon the conductivity of the semiconductive material and junctions, and the capacitance of the junctions, and, it has been found, is amenable to alteration between large values by control of the polarity of the intermediate zone relative to that of the outer zones and with expenditure of but small control currents.

The physics of operation of devices constructed in accordance with this invention will be appreciated from consideration of a specific embodiment involving a semiconductive body of NPN configuration. Assume that the P zone is biased negative with respect to the N zones. Then, both the NP junctions are biased in the reverse direction and flow of electrons into or through the P zone is suppressed. If the bias is applied through a low impedance circuit, the P layer is in effect grounded. Thus, the conductance of the body between the terminals on the N zones is low and transmission of signals between these terminals by capacitative effects through the body is small. Hence, the semiconductive element presents a high impedance, in both directions, between the terminals.

However, if the P zone is biased positive with respect to the N zones, both PN junctions are biased in the forward direction. As the P zone is thin, very little of the current to the connection to this zone is carried by electrons and a large current is carried by holes which diffuse from the P zone to the N zones. Thus, the conductance from one N zone to the other is large and a low impedance, in either direction, obtains between the terminals.

Particularly advantageously, both of the N zones are of high conductivity and the P zone is of lower conductivity, whereby suppression of hole flow into the N zones is enhanced and electron flow through the P layer is facilitated.

The invention, and the above-noted and other features thereof, will be understood more clearly and fully from the following detailed description with reference to the accompanying drawing in which the single figure is in part of a diagrammatic side view of a semiconductive body and in part a circuit schematic depicting one illustrative embodiment of this invention.

The circuit controlling device illustrated in the drawing comprises a semiconductive body designated 10 as a whole and being for example of germanium or silicon and advantageously, of single crystal structure. The body 10 has therein two outer portions 11 and 12 of one conductivity type, for example N conductivity type, and an intermediate portion 13 of the opposite conductivity type forming junctions with the outer zones 11 and 12. Substantially ohmic connections 14, 15 and 16 are made to the zones 11, 12 and 13, respectively. The connections 14 and 15 may be rhodium or copper platings upon the zones 11 and 12. The connection 16 may be, for example, a wire embedded in the zone 13 in the manner disclosed in the application Serial No. 228,483, filed May 26, 1951, of W. Shockley, now Patent 2,654,059, issued September 29, 1953.

Connected directly between the zones 11 and 12 and in series relation are the secondary winding of an input transformer 17 and the primary winding of output transformer 18. A double pole double throw switch 19 having terminals 20, 21 and 22, 23 is connected between the P zone 13 and a terminal between the secondary winding of transformer 17 and the primary winding of transformer 18. A low impedance direct current source 24, such as a battery, is bridged across the terminals 20, 21 and, as shown clearly in the drawing, the terminals 21 and 22 are directly cross-connected and the terminals 20 and 23 are cross-connected by way of a resistor 25.

When the switch 19 is closed over the terminals 20 and 21, the P zone 13 is biased negative with respect to both the N zones 11 and 12 and the two PN junctions in the body are biased in the reverse direction. Under these conditions flow of electrons into the P zone 13 from the zones 11 and 12 is suppressed. Also it will be noted that in effect the P zone 13 is grounded so that transmission of signals by capacitative effects of the junctions and through the device will be extremely small. Hence, for this position of the switch 19, the body 10 presents a very high impedance to transmission of signals from the input side 17 to the output side 18 or vice versa.

If, however, the switch 19 is closed over the terminals 22 and 23 the zone 13 is biased in the forward direction relative to the zones 11 and 12 through the resistor 25 and the PN junctions are biased in the forward direction. Hence, the impedance presented to flow of electrons in either direction between the terminals 14 and 15 is small. The increase in conductivity is enhanced by virtue of the current multiplication factor, $\alpha$.

Thus, it will be seen that by control of the polarity of the bias upon the zone 13, the conductance of the body 10 between the terminals 14 and 15 is readily changed from a high value to a low value or vice versa.

Advantageously, as has been indicated hereinabove, the P zone should be very thin and the N zones 11 and 12 highly conducting and of long lifetime material with long lifetime surfaces. Also advantageously, the P zone 13 should be of conductivity less than that of the outer zones 11 and 12. In a typical device the P zone 13 may be $10^{-3}$ inches thick, the N zones 11 and 12 may have a conductivity of the order of 20 mho centimeter and the P zone 13 may have a conductivity of the order of 1 mho centimeter. For such device and wherein the zones 11 and 12 were 0.125 inch thick, with a source 24 of 3 volts, the impedance presented by the body 10 when the zone 13 was biased negative was about $10^7$ ohms whereas when this zone was biased positive through a resistor 25 of 30,000 ohms the impedance between the terminals 14 and 15 was about 700 ohms.

From these figures it will be noted that the current expenditure requisite to effect control of the conductance of the body 10 between the terminals 14 and 15 is very small.

Although the invention has been described with particular reference to a semiconductive body 10 having a P zone between two N zones, it will be understood that it is applicable also to devices including an N zone between two P zones. For the latter case, of course, the polarity of the source 24 should be reversed from that illustrated in the drawing. Also, although in the specific embodiment illustrated a manually operated double pole double throw switch is utilized, it will be appreciated that electrical or electromechanical switches may be employed. Finally, it will be understood that the specific embodiment shown and described is but illustrative and that various modifications may be made therein without departing from the scope and spirit of this invention.

What is claimed is:

1. A circuit controlling device comprising a body of semiconductive material having therein a pair of outer zones of one conductivity type on opposite sides of and contiguous with an intermediate zone of the opposite conductivity type, an input terminal on one outer zone, an output terminal on the other outer zone, a connection between said terminals, and means for controlling the impedance presented by said body between said terminals comprising means capable of two states for selectively biasing the intermediate zone in one state positive with respect to both said outer zones and in the other state negative with respect to both said outer zones.

2. A circuit controlling device in accordance with claim 1 wherein said semiconductive material is germanium.

3. A circuit controlling device in accordance with claim 1 wherein said body is of germanium, said outer zones are of N conductivity type and have a conductivity of about 20 mho centimeter, and said intermediate zone is of the order of $10^{-3}$ inches thick and has a conductivity of about 1 mho centimeter.

4. A circuit controlling device comprising a body of semiconductive material having therein a pair of outer zones of one conductivity type on opposite sides of and contiguous with an intermediate zone of the opposite conductivity type, a controlled circuit connected between said outer zones, and means for selectively biasing said intermediate zone relative to said outer zones, either in the reverse direction through a low impedance or in the forward direction through a high impedance.

5. A circuit controlling device comprising a body of semiconductive material having therein a pair of outer zones of one conductivity type on opposite sides of and contiguous with an intermediate zone of the opposite conductivity type, substantially ohmic terminals on each of said zones, a controlled circuit connected between the terminals on said outer zones, and a control circuit connected between the terminal on said intermediate zone and an intermediate point on said controlled circuit, said control circuit including a source and means for selectively connecting said source in either polarity relation between said point and said terminal on said intermediate zone.

6. A circuit controlling device comprising a body of semiconductive material having therein a P zone intermediate and contiguous with a pair of N zones, an input and an output impedance connected serially between said N zones, a terminal on said P zone, a terminal between said input and output impedances, a potential source, and means for selectively connecting said source between said terminals either directly to bias said P zone negative or through a high impedance to bias said P zone positive.

References Cited in the file of this patent

UNITED STATES PATENTS

| | | |
|---|---|---|
| 2,569,347 | Shockley | Sept. 25, 1951 |
| 2,570,978 | Pfann | Oct. 9, 1951 |
| 2,612,567 | Stuetzer | Sept. 30, 1952 |
| 2,622,213 | Harris | Dec. 16, 1952 |